Patented June 24, 1930

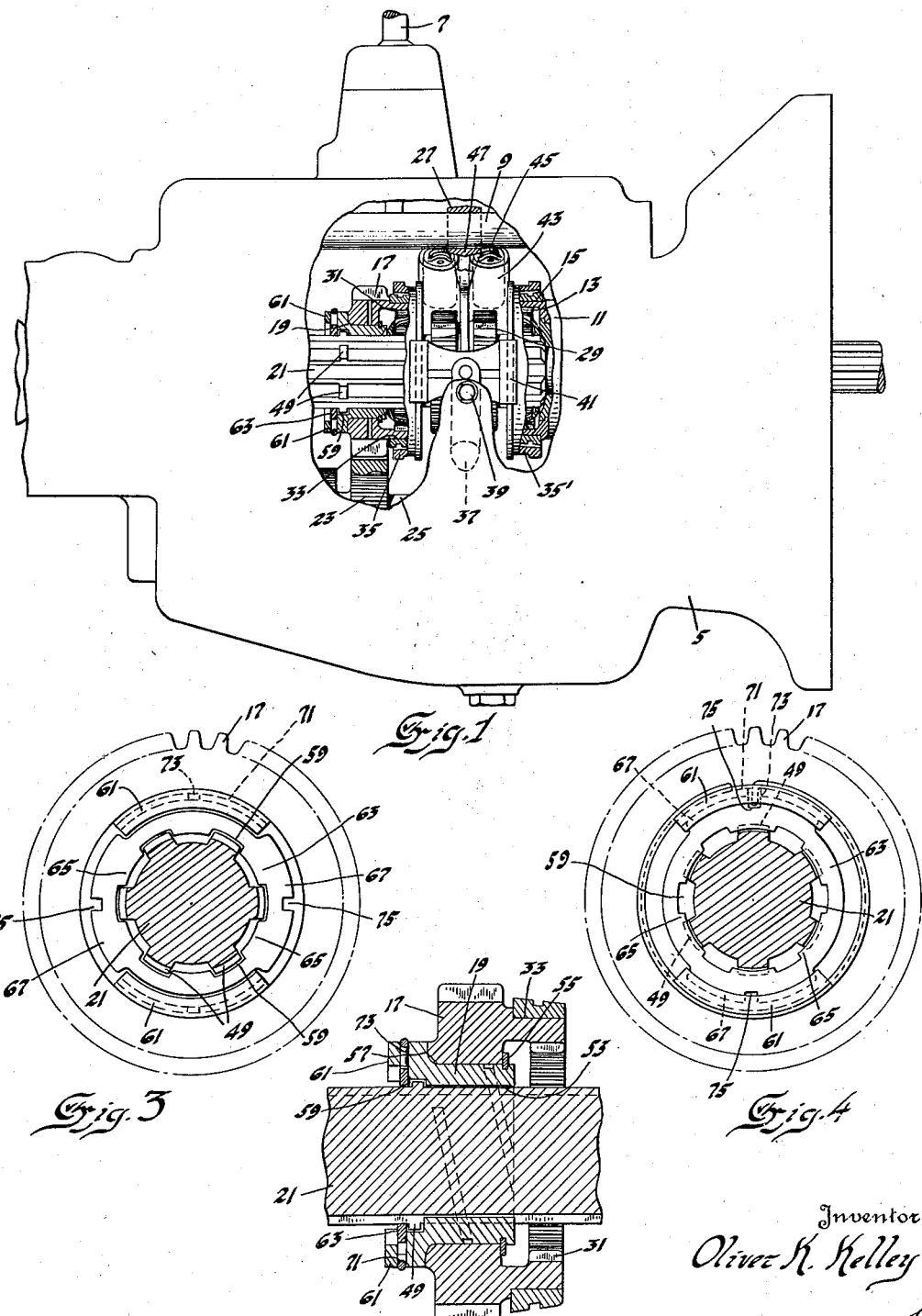

1,768,481

UNITED STATES PATENT OFFICE

OLIVER K. KELLEY, OF DETROIT, MICHIGAN, ASSIGNOR TO GENERAL MOTORS CORPORATION, OF DETROIT, MICHIGAN, A CORPORATION OF DELAWARE

TRANSMISSION

Application filed May 11, 1929. Serial No. 362,422.

This invention relates to transmission mechanism for motor vehicles and particularly to a synchronizing transmission.

In a known form of synchronization, the second speed driven gear is rotatably mounted on the driven shaft and is in constant mesh with its driving gear on the countershaft. Driving connection between this driven gear and the shaft is first frictionally made and thereafter positively made. The present invention is concerned with such an arrangement and aims to provide an improvement by which the release action of the friction clutch is facilitated. As a further object, the invention provides for a convenient assembly of the parts by which the second speed driven gear is held from axial movement along its shaft.

Other objects and advantages will be understood from the following description.

In the drawing:

Figure 1 is a view in side elevation of a vehicle transmission, the view being broken away to disclose the invention which is the subject matter of this application.

Figure 2 is a longitudinal section through the second speed driven gear showing the retaining means.

Figure 3 is a transverse section through the spline shaft showing the interlocking members in one position of adjustment.

Figure 4 is a similar view, the parts being in a second position of adjustment.

Referring by reference characters to the drawing, the numeral 5 represents a transmission casing containing a synchronizing transmission partly shown. At 7 is the gear shift lever which operates the shift rods, one of which is designated by numeral 9. The end of driving shaft 11 has internal clutch teeth 13 and an external friction surface 15. The second speed driven gear 17 is rotatable upon a bushing 19 positioned on the spline shaft 21. Gear 17 is in constant mesh with driving gear 23 on countershaft 25.

A fork 27 carried by rod 9 actuates a double clutch member 29 splined to the spline shaft 21. This clutch is designed to engage by its forward portion clutch teeth 13 of the driving shaft or by its rear portion clutch teeth 31 on the forward ring portion of gear 17. By this arrangement, the driving shaft and driven shafts may be clutched together for a direct drive or the second speed gear may be clutched to the spline shaft when the driven or spline shaft is to be driven in second speed, it being, of course, understood that the countershaft is driven in the usual way from the driving shaft.

Outside the clutch teeth 31 of the second speed gear there is a frictional surface 33. A spider drum 35 with a friction surface to at times engage surface 33 is splined on the driven shaft adjacent the ring on gear 17. Another similar spider drum 35' is associated with a friction surface 15 on the inner end of the driving shaft. A yoke 37 pivoted at 39 carries members 41, one of which is shown in the drawing. These members engage the two drums 35 and 35'. The movement of the yoke functions to effect the frictional engagement of the one or the other of the clutches as will be obvious. Rigid with the yoke is a member 43 having spring pressed plungers terminating in rollers 45, one on each side of the projection 47 on the rod 9.

In a manner well understood to those familiar with this type of transmission, the projection 47 pushes against one of the rollers when the rod 9 is longitudinally actuated whereby the yoke is moved and a frictional engagement of one of the other of the frictional clutches is made prior to the engagement of the corresponding positive clutch. After the movable friction clutch has reached the limit of its movement, the projection 47 depresses the plunger and thereafter and prior to the engagement of the positive clutch, some suitable means functions to effect the release of the friction clutch. Such means is not shown in the drawing since it constitutes no part of the invention.

The invention is concerned with the mounting of the second speed driven gear on the spline shaft. It is desirable that it have little, if any, movement axially on shaft 21 since otherwise as the movable friction clutch element withdraws, it may tend to carry the whole second speed gear with it and interfere with the release of the friction clutch prior to the engagement of the positive clutch. To that end, I provide the spline shaft with radially extended lugs 49. These lugs may be formed by extending the splines radially as indicated in Figure 1. I provide the bushing 19 with splines 53 to make slidable but nonrotatable engagement with the spline shaft and I mount the gear 17 rotatably on the bushing. A suitable retaining ring 55 is received in a circumferential recess of the bushing and engages one side of gear 17 holding the other side of the gear against a shoulder 57 of the bushing. In this way, the gear 17 is rotatable about the bushing but is retained from axial movement thereon in either direction. At one end, the bushing is recessed as at 59 so that when pushed along the spline shaft, it may engage, at the bottom of the recess, with the radially extended lugs on the splines as clearly shown in Figure 2. At the extreme end of the bushing, the recess is of greater radial dimensions and there are positively disposed inwardly directed overhanging tongues 61. A key in the form of an annular locking ring 63 is used to retain the bushing from axial movement along the shaft toward the right as shown in Figure 2. This ring has inwardly directed tongues 65 projecting into the circle defined by the lugs 49 but not into the region of the shaft splines. On the outside of the ring, there are radial tongues 67 shown as quadrants. These tongues may be positioned as in Figure 3 where they alternate with the tongues 61 of the bushing. When the locking ring is in this position, it may be slipped axially along the shaft 61 and within the end of the bushing until it is in a position adjacent the lugs 49. It may then be turned through 90° and assume the position shown in Figure 4 wherein its tongues 67 underlie the tongues 61 of the bushing. In this position, the inwardly direct tongues 65 engage the lugs 49 and the inter-engagement of parts 61 and 67 retain the locking ring and bushing in position. The bushing may be circumferentially grooved as at 71 and a wire may be wound about the groove with its ends inserted in openings 73 and 75 in bushing and locking ring to prevent relative rotation of these parts.

By the above improvements, it is possible to readily assemble the bushing and the second speed driven gear on the spline shaft. No forward movement of the second speed gear can occur when the movable element of the friction clutch returns to its release position. The mesh of the positive clutch is therefore facilitated and the operation of the synchronizing transmission as a whole greatly improved.

I claim:

1. In combination, a shaft, a bushing thereon, a gear rotatable about said bushing, means to retain said gear from axial movement relative to said bushing, and means to retain said bushing from axial movement relative to said shaft, said last mentioned means including a plurality of lugs radially extending from said shaft, said bushing having a radial face to engage said lugs on one side thereof, a retaining member carried by said bushing to engage said lugs on the other side thereof.

2. In combination, a shaft, a bushing nonrotatable thereon, means to retain said bushing from axial movement, comprising a plurality of radial lugs on said shaft, said bushing being axially recessed to form a radial surface to engage said lugs, a locking ring carried by said bushing within said recess to engage said lugs on the opposite sides thereof.

3. The invention defined by claim 2 together with interlocking means on said bushing and ring to retain said ring from movement axially relative to said bushing in one position of circumferential adjustment of said ring.

4. In combination, a transmission shaft, a bushing splined thereon, a gear rotatably mounted on said bushing, said bushing having a radial shoulder engaged by said gear to retain said gear from axial movement in one direction, a removable ring carried by said bushing and engaging a radial face on said gear to hold the gear from axial movement relative to said bushing in an opposite direction, said shaft having radial lugs, said bushing axially recessed to form a radial surface engaging said lugs on one side thereof, and a lock ring carried by said bushing engaging said lugs on the other side thereof to retain the bushing from axial movement relative to the shaft in both directions.

5. The invention defined by claim 4, said bushing and ring having tongues inter-engaging in one position of rotatable adjustment of said ring to hold the ring in position on said bushing, and radially extending locking means to prevent relative rotation of said ring and bushing.

6. In a synchronizing transmission, constant mesh second speed gearing including a driving and driven gear, a splined shaft, a bushing thereon, said driven gear rotatable on said bushing, a movable friction clutch and positive clutch elements to connect said driven gear to said shaft, means to retain said gear from axial movement on said bushing and means associated with said bushing and splined shaft to hold said bushing from axial movement in either direction on said shaft whereby the engagement of and release of the friction clutch element is facilitated, said last mentioned means comprising a series of radially directed lugs on said spline shaft extended beyond the splines thereof, said bushing having an axial recess whereby it is seated against said lugs at one side thereof, and a ring rotatable into locked engagement with said bushing to engage said lugs on the other side thereof.

In testimony whereof I affix my signature.

OLIVER K. KELLEY.